(12) United States Patent
Balasubramanian et al.

(10) Patent No.: US 11,132,250 B2
(45) Date of Patent: Sep. 28, 2021

(54) SYSTEM AND METHOD FOR REMOTELY DIAGNOSING AND REPAIRING A COMPUTING DEVICE

(71) Applicant: Sutherland Global Services, Inc., Pittsford, NY (US)

(72) Inventors: Balamurugan Balasubramanian, Chennai (IN); Naveen Kumaresan, Chennai (IN); Sanooj P S, Cochin (IN); Venkatesh Madhavan, Chennai (IN)

(73) Assignee: Sutherland Global Services, Inc., Pittsford, NY (US)

( * ) Notice: Subject to any disclaimer, the term of this patent is extended or adjusted under 35 U.S.C. 154(b) by 242 days.

(21) Appl. No.: 14/436,512

(22) PCT Filed: Oct. 18, 2013

(86) PCT No.: PCT/IN2013/000641
§ 371 (c)(1),
(2) Date: Apr. 17, 2015

(87) PCT Pub. No.: WO2014/061040
PCT Pub. Date: Apr. 24, 2014

(65) Prior Publication Data
US 2015/0261598 A1 Sep. 17, 2015

(30) Foreign Application Priority Data

Oct. 18, 2012 (IN) .......................... 4340/CHE/2012

(51) Int. Cl.
*G06F 11/07* (2006.01)
(52) U.S. Cl.
CPC ...... *G06F 11/0793* (2013.01); *G06F 11/0709* (2013.01); *G06F 11/079* (2013.01); *G06F 11/0721* (2013.01); *G06F 11/0748* (2013.01)

(58) Field of Classification Search
CPC .............. G06F 9/4416; G06F 11/1417; G06F 11/0748; G06F 11/079; G06F 11/0793; G06F 11/0721; G06F 11/0709
See application file for complete search history.

(56) References Cited

U.S. PATENT DOCUMENTS 6,697,962 B1   2/2004 McCrory et al.
6,931,558 B1 *  8/2005 Jeffe ................... G06F 11/1464
                                              713/340

(Continued)

OTHER PUBLICATIONS

Knapczyk, Frederic, "European Search Report," search completed Sep. 30, 2015, dated Oct. 8, 2015 for European Application No. EP 13 84 7823.5, The Hague.

(Continued)

*Primary Examiner* — Jigar P Patel
(74) *Attorney, Agent, or Firm* — Woods Oviatt Gilman LLP; Dennis B. Danella, Esq.

(57) ABSTRACT

A method for diagnosing and repairing a first computing device that is not able to be booted due to a malfunction of the first computing device is provided. The method comprises providing a boot tool stored on a removable computer readable storage medium; allowing the first computing device to be booted using the boot tool; providing for communication between the first computing device and a remote help desk computing device over a network; remotely identifying the malfunction of the first computing device; and pushing at least one repair data file from the remote help desk computing device to the first computing device or downloading the at least one repair data file from the Internet using the first computing device, wherein the at least one repair data file is configured for repairing the first computing device so that the first computing device is bootable without use of the boot tool.

15 Claims, 4 Drawing Sheets

(56) References Cited

U.S. PATENT DOCUMENTS

| | | | |
|---|---|---|---|
| 9,760,528 B1* | 9/2017 | Huynh Van | G06F 15/177 |
| 2004/0210796 A1 | 10/2004 | Largman et al. | |
| 2005/0176415 A1* | 8/2005 | Jang | G06F 21/56 |
| | | | 455/418 |
| 2006/0107119 A1 | 5/2006 | Miller et al. | |
| 2006/0271773 A1* | 11/2006 | Marquiz | G06F 11/2294 |
| | | | 713/1 |
| 2007/0288572 A1 | 12/2007 | Busa | |
| 2008/0033882 A1 | 2/2008 | Kafkarkou et al. | |
| 2008/0034060 A1 | 2/2008 | Fisher, Jr. | |
| 2008/0172421 A1* | 7/2008 | Birnbaum | G06F 11/0709 |
| 2009/0037496 A1 | 2/2009 | Chong et al. | |
| 2009/0049343 A1* | 2/2009 | Katz | G06F 11/2294 |
| | | | 714/46 |
| 2009/0249120 A1* | 10/2009 | Yao | G06F 11/1417 |
| | | | 714/15 |
| 2010/0202617 A1* | 8/2010 | Balakrishnan | G06F 21/575 |
| | | | 380/277 |
| 2011/0099097 A1* | 4/2011 | Svedberg | H04L 12/14 |
| | | | 705/30 |
| 2012/0066546 A1* | 3/2012 | Kim | G06F 11/1417 |
| | | | 714/15 |
| 2013/0103749 A1* | 4/2013 | Werth | G06F 9/5072 |
| | | | 709/203 |

OTHER PUBLICATIONS

Young, Lee W., "International Search Report," dated Jan. 21, 2015 for application No. PCT/IN2013/000641, ISA/U.S. Commissioner for Patents, Alexandria, Virginia.

Young, Lee W., "Written Opinion of the International Searching Authority," dated Jan. 21, 2015 for application No. PCT/IN2013/000641, ISA/U.S. Commissioner for Patents, Alexandria, Virginia.

Knapczyk, Frederic, "European Examination Report," dated Sep. 27, 2018 for European Application No. EP 13 84 7823.5, European Patent Office, Rijswijk, Netherlands.

Registered Letter, "Summons to attend oral proceedings pursuant to Rule 115(1) EPC", Jun. 5, 2020 relative to European Application No. 13 847 823.5, European Patent Office, Rijswijk, Netherlands.

* cited by examiner

SYSTEM AND METHOD FOR REMOTELY DIAGNOSING AND REPAIRING A COMPUTING DEVICE

This application is a National Stage filing under 35 U.S.C. § 371 of International Application No. PCT/IN2013/000641, filed Oct. 18, 2013, which in turn claims priority to Indian Patent Application No. 4340/CHE/2012, filed on Oct. 18, 2012 and entitled "SYSTEM AND METHOD FOR REMOTELY DIAGNOSING AND REPAIRING A COMPUTING DEVICE", the entire contents of which are hereby incorporated by reference herein for all purposes.

FIELD OF THE INVENTION

The present invention relates to a system and method for remotely diagnosing and repairing a computing device that is unable to boot. More particularly, the method and system includes the use of a data storage device, such as a USB drive, having a boot tool that is used to boot the computing device and initiate communication with a remote help desk computing device over a network, wherein the remote help desk computing device communicates with the computing device to remotely diagnose and repair the computing device by pushing at least one repair data file to the computing device, correcting issues in the operating system, or fixing the filing system in the computing device.

BACKGROUND OF THE INVENTION

It is not uncommon for a situation to arise where a personal computer or laptop is unable to boot after the computer is powered on or restarted due to a computer malfunction or error. There may be many reasons for this no boot situation including driver corruption, including, but not limited to, when the computer displays a blue screen commonly known as the Blue Screen of Death (BSOD), in situations where there is a hung system, a black screen with an error code, or spontaneous restarts without any errors. As personal computers and laptops have become more prevalent in society, the need for simple yet reliable service of these machines has led to a number of computer service systems for diagnosing and repairing problems that may arise. These systems can be generally divided into two classes—on-site service, and off-site or remote service.

On-site service entails a computer service technician being physically located with the computing device in need of repair. One approach is to have a technician come to an owner's home to conduct service. This approach, however, is expensive because the owner is paying not only for the time it takes to service the computer, but also for travel time and expenses for the technician to travel to the owner's home. Further, scheduling an appointment for such an on-site service may be difficult to arrange as, typically, the owner needs or wants to be present at the time of the service. This means that the owner must either take time away from work or schedule an after-hours appointment. An alternative on-site service regime requires the owner to remove the computer from the home and physically deliver the inoperable computer to a service site so that the service technician can have physical access to the computer. Thus, the owner must disassemble the computer and spend the time, effort and money to drive or ship the computer to the service location. Often, the computer will need to be left at the service center for a day or two, sometimes longer, while undergoing service. In either on-site scenario, data privacy concerns may arise since possession of the inoperable computer is no longer solely under the owner's control. As such, the owner is without the use of the computer for a number of days, is required to drop off and pick up the computer, and has to disassemble and reassemble the computer pre- and post-repair.

To alleviate the hassles of on-site service, a number of systems have been developed which utilize off-site or remote computer repair services. Typically, these systems utilize a communication device, such as telephone, where an owner/user contacts a support technician located at a remote service location. The support technician then attempts (usually requiring input or assistance from the owner/user) to diagnose the error and instructs the owner/user on the steps to be taken to repair the system over the telephone, if possible. If more advanced repairs are needed, the owner/user may still require an on-site service repair appointment.

With the proliferation of the Internet and high-speed data communication, newer off-site systems utilize an Internet connection for communication between a remote service technician and the owner/user. Indeed, provided the Internet connection is functional on the computer needing repair, the service technician is able to communicate directly with the computer through remote access to the computer's operating system and stored software, thereby reducing the need for owner/user aid. However, if Internet communication is disrupted or unavailable using the afflicted computing device, off-site repairs cannot be made.

As such, there is a need for a system and method that provides for remote diagnosis and repair of computing devices where the afflicted computing device does not have Internet access. Additionally, there is a need for a system and method that supports two-way communication and transfer of data files between an afflicted computing device and a remote help desk computing device. Further, there is a need for a system and method that provides remote support and repair without requiring access to personal data on the afflicted computing device. The present invention addresses these and other needs.

BRIEF SUMMARY OF THE INVENTION

In one aspect, the present invention is directed to a method for diagnosing and repairing a first computing device that is not able to be booted due to a malfunction of the first computing device. More specifically, the method comprises: providing a boot tool stored on a removable computer readable (or computer readable/writable) storage medium; allowing the first computing device to be booted using the boot tool; providing for communication between the first computing device and a remote help desk computing device over a network; remotely identifying the malfunction of the first computing device; and pushing at least one repair data file from the remote help desk computing device to the first computing device, wherein the at least one repair data file is configured for repairing the first computing device so that the first computing device is bootable without use of the boot tool. While referenced and described as pushing at least one repair data file, the method and system of the present invention may further provide for remote repair of the operating system or filing system, as well as manual troubleshooting following remote takeover of the first computing device.

In another aspect, the present invention is directed to a system comprising a remote help desk computing device, a boot tool, and a communication module. The boot tool is stored on a removable computer readable storage medium and is configured to boot the first computing device. The communication module is configured to provide two-way communication over a network between the first computing device and the remote help desk computing device. The two-way communication may be in the form of wireless communication, such as, for example, Wi-Fi, 3G, 4G and the like. The remote help desk computing device is configured for pushing at least one repair data file from the remote help desk computing device to the first computing device. The at least one repair data file is configured for repairing the malfunction in the first computing device so that the first computing device is bootable without use of the boot tool.

In yet another aspect, the present invention is directed to a computer diagnosis and repair system for addressing a no boot scenario. The system comprises a first computing device that is not able to be booted due to a malfunction of the first computing device, a remote help desk computing device, a boot tool, and a communication module. The boot tool is stored on a removable computer readable storage medium and is configured to boot the first computing device. The communication module is configured for providing communication between the first computing device and the remote help desk computing device over a network. The remote help desk computing device is configured for pushing at least one repair data file from the remote help desk computing device to the first computing device, wherein the at least one repair data file is configured for repairing the first computing device so that the first computing device is bootable without use of the boot tool.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Generally, the system and method described herein for remotely diagnosing and repairing a computing device that is not able to be booted may be implemented in hardware, software or a combination thereof, and may be distributed across a variety of computing devices.

This document is organized as follows. In the first section, an overview of the techniques and implementation is provided and is described with reference to some component devices and aspects of the invention. In the next section, an exemplary algorithm for providing the method in accordance with one aspect of the present invention is discussed. Finally, an exemplary computer environment for the implementation and use of the invention is described.

The present invention provides a system and method for remotely diagnosing and repairing a computing device that will not boot due to a malfunction or error in the computing device. The present system and method allows the computing device to be remotely diagnosed and repaired even if the scripts or tools necessary to correct the issue that is preventing the computing device from booting are not stored in the computing device. Moreover, the system and method of the present invention also allow the computing device to be remotely diagnosed and repaired even if the computing device is not connected to a network, such as the Internet.

Figure 1:
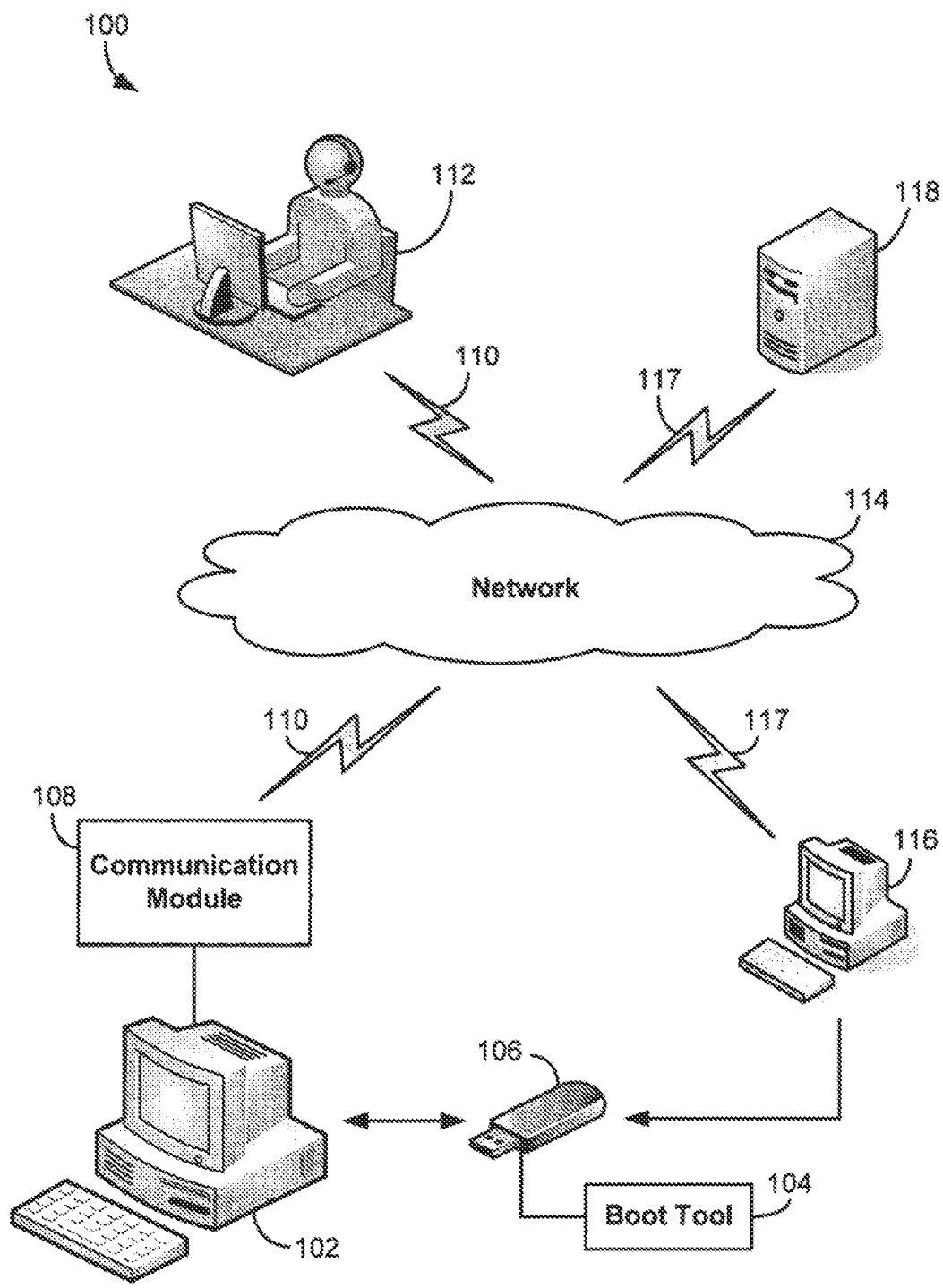
FIG. 1 is a schematic drawing of a system for remotely diagnosing and repairing a first computing device that is not able to be booted due to a malfunction of the first computing device according to one aspect of the present invention.

Referring to the drawings in detail, and initially to FIG. 1, a computer diagnosis and repair system is provided and identified as reference number 100. In general, the system 100 is configured for remotely diagnosing and repairing a computing device 102 that is not able to be booted due to a malfunction or error in computing device 102. In one aspect of the present invention, computing device 102 may be a device such as a personal computer (PC), laptop computer, or tablet PC that is located in a home, office, or other location. However, it should be understood that computing device 102 may be any computer-based system having a hard drive or solid-state drive, and processor running an operating system.

A malfunction or error during the boot process typically results in computing device 102 displaying a blue screen indicating that a hardware or driver problem has occurred. The error causes the computer to stop responding in order to prevent damage to the operating system or stored data. This is commonly referred to as a "blue screen of death" ("BSoD) scenario. When afflicted by the BSoD, a computer is unable to load the operating system and data or other files are not accessible. Typically, users of personal computers who experience the BSoD are unable to fix the errors causing the BSoD themselves and these users either hire a technician to service the computer or simply elect to purchase a new computer. Although described as diagnosing and repairing BSoD scenarios, the present invention is also applicable to other malfunctions where a computer is not able to be booted including, without limitation, computing devices that are in a no boot state, experiencing a reboot loop, a black screen error, a log on failure, or a hung system.

The present invention seeks to resolve issues involving non-bootable computing devices, including instances of BSoD, by providing a boot tool 104 that is stored on a removable computer readable storage medium 106 such as, but not limited to, a universal serial bus (USB) flash drive, compact disc (CD), digital versatile disc (DVD), USB data card, smartphone, and the like. Boot tool 104 may include one or more executable files, scripts, software application programs, or operating system that allow computing device 102 to be booted when removable storage medium 106 is inserted into, or otherwise connected to or in communication with, computing device 102. It should be understood that a BIOS setting in computing device 102 may need to be changed to provide the appropriate booting sequence to use boot tool 104 to boot computing device 102.

Figure 1A:
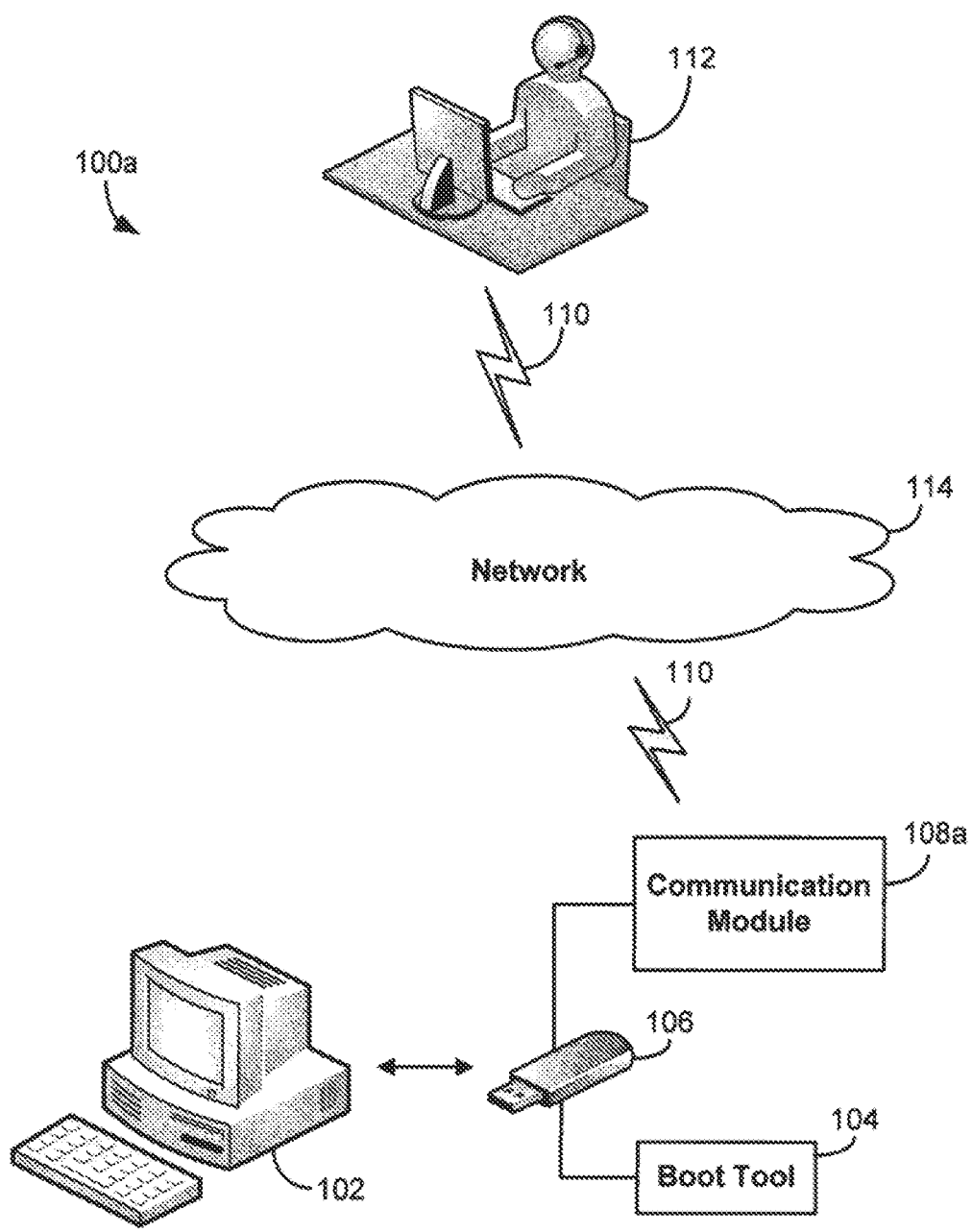
FIG. 1A is a schematic drawing of a system for remotely diagnosing and repairing a first computing device according to another aspect of the present invention.

With continued reference to FIG. 1, system 100 further includes a communication module 108 that is configured for placing computing device 102 in two-way communication 110 with a remote help desk computing device 112 over a communication network 114. Communication network 114 may include a Local Area Network (LAN), a Wide Area Network (WAN) such as the Internet, a wireless network, or other similar configuration providing communication 106 among computing devices 102, 106. In one aspect of the present invention, communication module 108 may be a modem or other network interface device provided in computing device 102 that allows remote help desk computing device 112 and computing device 102 to communicate with each other over network 114. If computing device 102 does not have access to network 114, another aspect of the present invention, as shown in FIG. 1A, provides a system 100a that includes communication module 108a, such as, for example, a USB network data card, so that computing device 102 and remote help desk computing device 112 may communicate wirelessly over network 114. In other words, system 100a may be used if computing device 102 does not have access to the Internet, but still needs to be fixed using the method described herein. It should be understood that communication module 108 may either be included in the same device that includes removable computer readable storage medium 106, as shown in FIG. 1A, or provided in a separate device.

Figure 2:
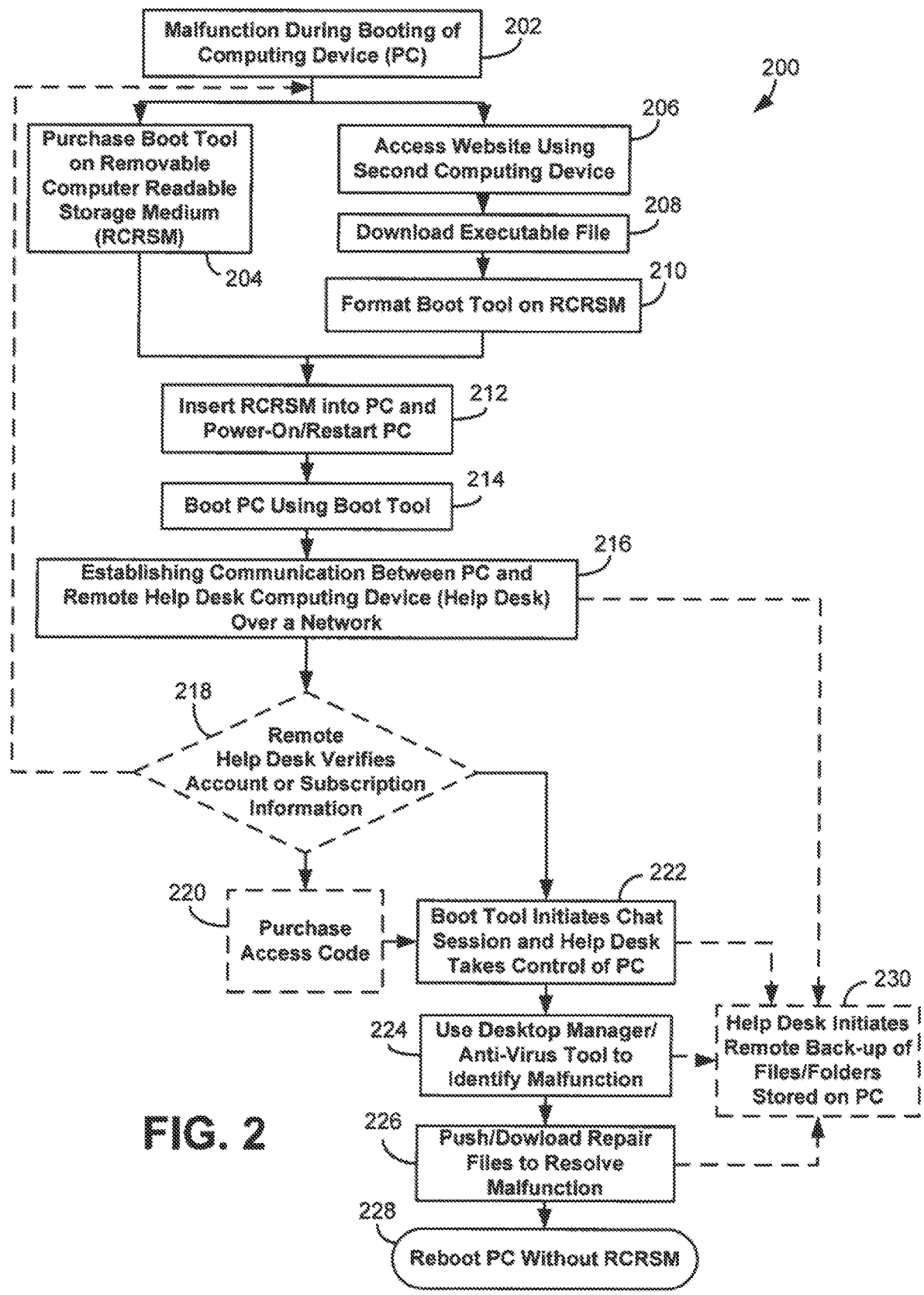
FIG. 2 is a flow diagram of a method for remotely diagnosing and repairing a first computing device that is not able to be booted due to a malfunction of the first computing device according to one aspect of the present invention.

Having described some of the component devices and aspects that may be included in system 100, 100a, an exemplary algorithm for providing a method 200 for diagnosing and repairing computing device 102 that is not able to be booted due to a malfunction or error of computing device 102 will be described with reference to FIG. 2. As mentioned above, method 200 is implemented when computing device 102 encounters a malfunction or error during the boot process at step 202. If this situation is encountered, method 200 includes providing a user of computing device 102 with boot tool 104 stored on removable computer readable storage medium 106. In one aspect of the present invention, boot tool 104 may be provided to the user by purchasing a removable computer readable storage medium, such as a USB flash drive, CD or DVD preloaded with boot tool 104 at step 204. This purchase may be at a retail location or at an online store using the Internet and then shipped to the user. Alternatively, the removable computer readable storage medium may be provided with the purchase of a new computing device to be retained by the owner for possible future use, as required.

In another aspect of the present invention, with additional reference to FIG. 1, boot tool 104 may be provided to the user of computing device 104 through the use of a second computing device 116 in working condition and a removable computer readable storage medium, such as a USB flash drive, CD, DVD, or Blu-Ray drive, with available data storage capacity. Second computing device 116 may be any type of computing device, including a personal computer, laptop, or smartphone. In this particular aspect, at step 206, the user is provided with a uniform resource locator (URL) and the user connects to an Internet website through network 114 by entering the URL using the second computing device. In one aspect of the invention, the URL may require the user to enter a user identification and password in order to access the website. Therefore, access to the website may be subscription-based or paid by the user each time access to the website is desired. From the Internet website, an executable file is downloaded on second computing device 116 at step 208. If the user pays for one-time access to the website, the URL may be configured for a single-use where it becomes inaccessible following a download of the executable file to second computing device 116. After the executable file is downloaded, the removable computer readable storage medium is connected to second computing device 116 and the executable file thereafter runs. At step 210, the executable file is used to format the removable computer readable storage medium, such as, but not limited to, a USB drive, and creates the USB drive as a bootable disk, namely, boot tool 104. While the example set forth below references the use of a USB drive, it should be understood that any removable computer readable storage medium could be used, such as a CD, DVD, Blu-Ray drive, or the like. During the generation of boot tool 104, the executable file establishes communication 117 with a help desk server 118 over the network 114 to burn the image of an ISO file on the USB drive. In another embodiment, it is envisioned that the executable file and ISO file are bundled together as one executable file where, when run, both files will be extracted and preform their respective actions to format and create the boot tool.

After boot tool 104 has been created on USB drive 106, method 200 further comprises using boot tool 104 to boot computing device 102. In order for this to occur, USB drive 106 is inserted or otherwise connected to computing device 102 and computing device 102 is then powered on or restarted at step 212. Depending on the settings in computing device 102, the BIOS setting in computing device 102 may need to be changed so that computing device 102 automatically boots through boot tool 104.

At step 214, computing device 102 boots using boot tool 104, and communication 110 is established between computing device 102 and remote help desk computing device 112 over network 114 at step 216. In particular, as best seen in FIG. 1, computing device 102 may be placed in communication with remote help desk computing device 112 using communication module 108 associated with computing device 102 if computing device 102 has stand-alone access to network 114 using a modem, for example. If computing device 102 does not have stand-alone access to network 114, computing device 102 may be placed in wireless communication with remote help desk computing device 112 using communication module 108a associated with USB drive 106, as shown in FIG. 1A. However, it should be understood that even if computing device 102 has stand-alone access to network 114, communication module 108A may still be used to connect to network 114.

After computing device 102 and remote help desk computing device 112 are placed in communication over network 114, at optional step 218, remote help desk computing device 112 verifies that the user of computing device 102 has an active account or subscription to obtain assistance from such a help desk service to diagnose and repair the malfunction that caused the problem during the boot process. If the help desk service is to be a free service, step 218 may be omitted and the method would proceed to step 222. In another aspect of the invention, the help desk service would be provided for a one-time fee or based on a subscription fee. For example, a single use code, or multiple use code under a subscription plan, may be provided upon purchase of USB drive at step 204, which would be acknowledged by remote help desk computing device 112 or verbally communicated to a help desk agent operating remote help desk computing device 112 in order to proceed to step 222. If the single use code is no longer valid, or the subscription has expired, the owner would either need to purchase a new access code at step 220 or purchase a new USB flash drive at step 204. If user paid for one-time access or subscription based access to the website to create boot tool 104 on USB drive 106 at steps 204, 206, 208, remote help desk computing device 112 or help desk agent would verify that information and the method would proceed to step 222.

At step 222, after computing device 102 and remote help desk computing device 112 are placed in communication over network 114, boot tool 104 is configured for initiating a chat session between computing device 102 and remote help desk computing device 112 over network 114, and allowing remote help desk computing device 112 to take virtual control of computing device 102. It should be understood that the chat session may include written and/or voice communication between computing device 102 and remote help desk computing device 112.

Upon taking control of computing device 102, at step 224, remote help desk computing device 112 pushes, downloads from the Internet using computing device 102, or otherwise transfers one or more tools or software application programs, such as but not limited to, a desktop manager tool or an anti-virus tool, to computing device 102 to enable remote help desk computing device 112 to access the files and folders stored in computing device 102 and identify the malfunction in computing device 102. After the malfunction is identified, at step 226, remote help desk computing device 112 pushes, downloads from the Internet using computing device 102, or otherwise transfers one or more repair data files to computing device 102, wherein the one or more repair files are configured for repairing computing device 102 so that computing device 102 is bootable without the use of boot tool 104. In other words, computing device 102 is repaired using repair files that are stored on remote help desk computing device 112 or a server accessible by remote help desk computing device 112, or downloaded from the Internet using computing device 102. Remote help desk computing device 112 may also be used to manually troubleshoot computing device 102. The one or more repair data files may include one or more scripts, tools, or a combination thereof. At step 228, after the malfunction has been repaired, USB drive 106 is removed and computing device 102 is rebooted by user. It will be understood that one aspect of the present invention allows computing device 102 to be repaired without the need for remote help desk computing device 112 to access private data stored on computing device 102.

An optional step 230 allows remote help desk computing device 112 to download or otherwise transfer one or more data files and/or folders retrieved from computing device 102 to a remote data storage device that is accessible by the user of computing device 102. The transfer of files and/or folders from computing device 102 serves as a back-up measure in the event that computing device 102 cannot be repaired at step using the repair files or manual steps, but must undergo an operating system re-installation (OSRI) which may erase all data stored on the memory of computing device 102. The remote data storage device may be help desk server 118 (FIG. 1) or any other remote data storage location, such as the cloud, an additional local external hard drive in the same computer, a different partition of the same hard drive, or an external hard drive, flash drive, CD, DVD, or Blu-Ray drive, that is distinct from the memory provided on computing device 102 that will not be erased during an OSRI of computing device 102. Step 230 may be performed at any suitable location within the method 200 after computing device 102 is placed in communication with remote help desk computing system 112 at step 216. For instance, remote storage of data files from computing device 102 may take place following confirmation of an active code at step 218 or step 222 so as to preserve any data retrievable upon booting before attempting to resolve the system malfunction. Alternatively, remote help desk computing device 112 may first diagnose the system error at step 224, and depending on the severity of the problem may then initiate remote storage of the data files or folders. A further scenario has remote help desk computing device 112 first attempting to resolve the malfunction by pushing or otherwise transferring one or more repair data files to computing device 102 at step 226. Only after determining that the repair files were unable to resolve the malfunction would remote help desk computing device 112 proceed to transfer the files to the remote storage location. The transferred files may then be stored remotely at least until the user completes an OSRI of computing device 102 or purchases a new computing device. The stored files may then be loaded onto the fixed computing device 102 or a new computing device, or left in the remote storage location for future use and/or transfer.

Having described the system and method of the present invention and an embodiment thereof, an exemplary computer environment for implementing the described design and execution is presented next.

Figure 3:
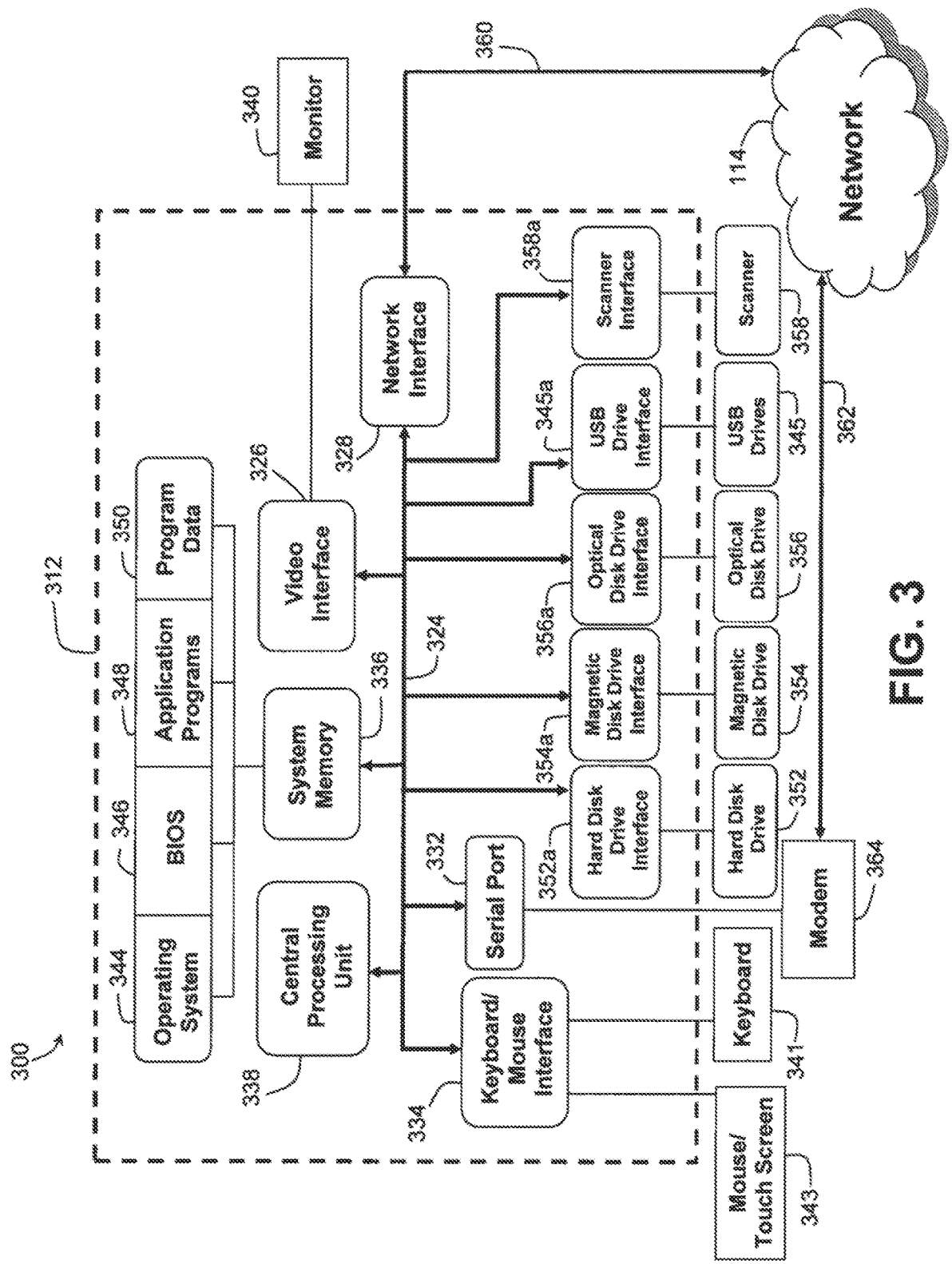
FIG. 3 is a block diagram generally illustrating a computing environment in which the invention may be implemented.

FIG. 3 shows an exemplary computing environment 300 that can be used to implement any of the processing thus far described. Computing environment 300 may include one or more computers 312 (such as computing device 102, remote help desk computing device 112, second computing device 116) comprising a system bus 324 that couples a video interface 326, network interface 328, a keyboard/mouse interface 334, and a system memory 336 to a Central Processing Unit (CPU) 338. A monitor or display 340 is connected to bus 324 by video interface 326 and provides the user with a graphical user interface that may be used to perform the steps of method 200 as described above. The graphical user interface allows the user to enter commands and information into computer 312 using a keyboard 341 and a user interface selection device 343, such as a mouse, touch screen, or other pointing device. Keyboard 341 and user interface selection device are connected to bus 324 through keyboard/mouse interface 334. Additional interfaces may also be employed, such as but not limited to PS/2 and USB interfaces, and the like. The display 340 and user interface selection device 343 are used in combination to form the graphical user interface which allows the user to implement at least a portion of the present invention. Other peripheral devices may be connected to the remote computer through universal serial bus (USB) drives 345, fire wire, network interface, and the like to transfer information to and from computer 312. Additional interfaces may also be employed, such as but not limited to PS/2 and USB interfaces, and the like.

The system memory 336 is also connected to bus 324 and may include read only memory (ROM), random access memory (RAM), an operating system 344, a basic input/output system (BIOS) 346, application programs 348 and program data 350. The computer 312 may further include a hard disk drive 352 for reading from and writing to a hard disk, a magnetic disk drive 354 for reading from and writing to a removable magnetic disk (e.g., floppy disk), and an optical disk drive 356 for reading from and writing to a removable optical disk (e.g., CD ROM or other optical media). The computer 312 may also include USB drives 345 and other types of drives for reading from and writing to flash memory devices (e.g., compact flash, memory stick/PRO and DUO, SD card, multimedia card, smart media xD card), and a scanner 358 for scanning items to computer 312. A hard disk drive interface 352a, magnetic disk drive interface 354a, an optical drive interface 356a, a USB drive interface 345a, and a scanner interface 358a operate to connect bus 324 to hard disk drive 352, magnetic disk drive 354, optical disk drive 356, USB drive 345 and scanner 358, respectively. Each of these drive components and their associated computer-readable media may provide remote computer 312 with non-volatile storage of computer-readable instruction, program modules, data structures, application programs, an operating system, and other data for computer 312. In addition, it will be understood that computer 312 may also utilize other types of computer-readable media in addition to those types set forth herein, such as digital video disks, random access memory, read only memory, other types of flash memory cards, magnetic cassettes, and the like.

Computer 312 may operate in a networked environment using logical connections with other computing devices. Network interface 328 provides a communication path 360 between bus 324 and network 114, which allows, for example, a desktop manager or anti-virus tool and one or more repair files to be communicated through network 114 from remote help desk computing device 112 to computing device 102. This type of logical network connection is commonly used in conjunction with a local area network (LAN). The desktop manager and one or more repair files may also be communicated from bus 324 through a communication path 362 to network 114 using serial port 332 and a modem 364. Using a modem connection between the computer 312, for example remote help desk computing device 112, and other computing devices in the network is commonly used in conjunction with a wide area network (WAN). It will be appreciated that the network connections shown herein are merely exemplary, and it is within the scope of the present invention to use other types of network connections between computer 312 and other computing devices including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method for diagnosing and repairing a first computing device that is not able to be booted due to a malfunction of the first computing device during a boot process, the method comprising:
   a) providing a boot tool stored on a removable computer readable storage medium, wherein the step of providing the boot tool comprises the steps of:
      i) allowing a second computing device to access an internet uniform resource locator (URL);
      ii) allowing a computer executable file to be downloaded to the second computing device over the network using the URL;
      iii) allowing the removable computer readable storage medium to be connected to the second computing device while not being connected to the first computing device, wherein the second computing device operates to use the computer executable file to format the removable computer readable storage medium to create the boot tool; and
      iv) allowing the removable computer readable storage medium including the boot tool to be disconnected from the second computing device;
   b) subsequent to disconnecting the computer readable storage medium from the second computing device, allowing the removable computer readable storage medium to be connected to the first computing device so that the boot tool operates to boot the first computing device;
   c) providing a communication module associated with the boot tool, wherein the communication module includes a wireless universal serial bus (USB) data card that allows for two-way wireless communication between the first computing device and a remote help desk computing device over a network;
   d) subsequent to using the boot tool to boot the first computing device, initiating, by the boot tool, a written and/or voice chat session between the first computing device and the remote help desk computing device over the network;
   e) pushing a desktop manager tool from the remote help desk computing device to the first computing device over the network to allow the remote help desk computing device to take virtual control of the first computing device;
   f) after the remote help desk computing device takes virtual control of the first computing device in step e), utilizing the remote help desk computing device to transfer retrievable data files stored in the first computing device to a remote data storage location over the network for backup at the remote data storage location;
   g) remotely identifying the malfunction of the first computing device using the remote help desk computing device over the network; and
   h) pushing at least one repair data file from the remote help desk computing device directly to the first computing device over the network, wherein the at least one repair data file is configured to repair the first computing device so that the first computing device is able to be booted without use of the boot tool.

2. A method in accordance with claim 1, wherein the second computing device is one of a personal desktop computer, a laptop computer, and a smartphone.

3. A method in accordance with claim 1, wherein the computer executable file is stored on a remote server that is available for download over the network.

4. A method in accordance with claim 1, wherein the URL is user identification and password protected.

5. A method in accordance with claim 1, wherein the URL is configured for a single-use and becomes inaccessible following a first download of the computer executable file.

6. A method in accordance with claim 1, wherein the at least one repair data file includes a script or a tool, and wherein the at least one repair data file is not a file that was stored in a memory of the first computing device.

7. A method in accordance with claim 6, wherein an anti-virus tool is pushed from the remote help desk computing device to the first computing device over the network to identify the malfunction of the first computing device.

8. A method in accordance with claim 1, wherein the boot tool does not include the at least one repair data file.

9. A system for diagnosing and repairing a first computing device that is not able to be booted due to a malfunction of the first computing device during a boot process, the system comprising:
- a remote help desk computing device;
- a boot tool stored on a removable computer readable storage medium, the boot tool configured to boot the first computing device;
- a communication module associated with the boot tool, wherein the communication module includes a wireless universal serial bus (USB) data card that allows for two-way wireless communication over a network between the first computing device and the remote help desk computing device, and wherein the communication module associated with the boot tool allows for a written and/or voice chat session to be initiated, by the boot tool, between the first computing device and the remote help desk computing device over the network;
- a desktop manager tool communicated from the remote help desk computing device to the first computing device over the network to allow the remote help desk computing device to take virtual control of the first computing device; and
- a remote data storage location in communication with the first computing device over the network,
- wherein, after the remote help desk computing device takes virtual control of the first computing device, the communication module allows one or more data files stored in a memory of the first computing device to be transferred to and stored in the remote data storage location over the network by the remote help desk computing device for backup at the remote data storage location,
- wherein the remote help desk computing device utilizes the desktop manager tool for remotely identifying the malfunction of the first computing device and pushes at least one repair data file from the remote help desk computing device directly to the first computing device over the network, wherein the at least one repair data file is configured to repair the malfunction in the first computing device so that the first computing device is able to be booted without use of the boot tool,
- wherein the system further comprises a second computing device, wherein the second computing device downloads a computer executable file over the network using an internet uniform resource locator (URL) for storage on the second computing device,
- wherein when the removable computer readable storage medium is connected to the second computing device and not connected to the first computing device, the second computing device operates to use the computer executable file to format the removable computer readable storage medium to create the boot tool, and
- wherein when the removable computer readable storage medium including the boot tool is disconnected to the second computing device and connected to the first computing device so that the boot tool operates to boot the first computing device.

10. A system in accordance with claim 9, wherein the second computing device is selected from a list comprising a personal desktop computer, a laptop computer and a smartphone.

11. A system in accordance with claim 9, further comprising a remote server, wherein the computer executable file is stored on the remote server and is available for download over the network using the second computing device.

12. A system in accordance with claim 9, wherein the URL is user identification and password protected.

13. A system in accordance with claim 9, wherein the URL is configured for a single-use and becomes inaccessible following a first download of the computer executable file.

14. A system in accordance with claim 9, wherein the at least one repair data file includes a script or a tool, and wherein the at least one repair data file is not a file that was stored in a memory of the first computing device.

15. A method for diagnosing and repairing a first computing device that is not able to be booted due to a malfunction of the first computing device during a boot process, the method comprising:
a) allowing a second computing device to access an internet uniform resource locator (URL), wherein a computer executable file is downloaded to the second computing device over the network using the URL, wherein the URL is configured for a single-use and becomes inaccessible following a first download of the computer executable file;
b) allowing a removable computer readable storage medium to be connected to the second computing device while not being connected to the first computing device, wherein the second computing device operates to use the computer executable file to format the removable computer readable storage medium to create a boot tool;
c) allowing the removable computer readable storage medium including the boot tool to be disconnected to the second computing device;
d) allowing the removable computer readable storage medium to be connected to the first computing device so that the boot tool operates to boot the first computing device;
e) providing a communication module associated with the boot tool, wherein the communication module includes a wireless universal serial bus (USB) data card that allows for two-way wireless communication between the first computing device and a remote help desk computing device over a network;
f) subsequent to using the boot tool to boot the first computing device, initiating, by the boot tool, a written and/or voice chat session between the first computing device and the remote help desk computing device over the network;
g) pushing a desktop manager tool from the remote help desk computing device to the first computing device over the network to allow the remote help desk computing device to take virtual control of the first computing device;
h) after the remote help desk computing device takes virtual control of the first computing device in step g), utilizing the remote help desk computing device to transfer retrievable data files stored in the first computing device to a remote data storage location over the network for backup at the remote data storage location;

i) remotely identifying the malfunction of the first computing device using the remote help desk computing device over the network; and j) pushing at least one repair data file from the remote help desk computing device directly to the first computing device over the network, wherein the at least one repair data file is configured to repair the first computing device so that the first computing device is able to be booted without use of the boot tool.

* * * * *